(12) United States Patent
Nilsson

(10) Patent No.: US 11,068,733 B2
(45) Date of Patent: Jul. 20, 2021

(54) BIOMETRIC IMAGING SYSTEM AND METHOD OF DETERMINING PROPERTIES OF A BIOMETRIC OBJECT USING THE BIOMETRIC IMAGING SYSTEM

(71) Applicant: Fingerprint Cards AB, Gothenburg (SE)

(72) Inventor: René Nilsson, Eslöv (SE)

(73) Assignee: Fingerprint Cards AB, Gothenburg (SE)

( * ) Notice: Subject to any disclaimer, the term of this patent is extended or adjusted under 35 U.S.C. 154(b) by 0 days.

(21) Appl. No.: 16/765,694

(22) PCT Filed: Nov. 14, 2018

(86) PCT No.: PCT/SE2018/051167
§ 371 (c)(1),
(2) Date: May 20, 2020

(87) PCT Pub. No.: WO2019/108110
PCT Pub. Date: Jun. 6, 2019

(65) Prior Publication Data
US 2021/0019540 A1  Jan. 21, 2021

(30) Foreign Application Priority Data
Nov. 28, 2017  (SE) .................................. 1751458-9

(51) Int. Cl.
*G06K 9/00* (2006.01)
*G06K 9/20* (2006.01)
(Continued)

(52) U.S. Cl.
CPC ....... *G06K 9/00906* (2013.01); *G06K 9/0061* (2013.01); *G06K 9/00604* (2013.01);
(Continued)

(58) Field of Classification Search
None
See application file for complete search history.

(56) References Cited

U.S. PATENT DOCUMENTS

2006/0139751 A1 6/2006 Cha et al.
2015/0356339 A1* 12/2015 Demos ............... G06K 9/00885
348/77
(Continued)

FOREIGN PATENT DOCUMENTS

WO 2017025575 A1 2/2017

OTHER PUBLICATIONS

PCT International Search Report and Written Opinion dated Feb. 6, 2019 for International Application No. PCT/SE2018/051167, 9 pages.

*Primary Examiner* — Christopher Braniff
(74) *Attorney, Agent, or Firm* — RMCK Law Group, PLC

(57) ABSTRACT

There is provided a biometric imaging system comprising a display panel. The display panel in turn comprises: a plurality of display pixels configured to emit visible light and controllable to form an image in the display; and a plurality of non-visible light emitting elements configured to emit linearly polarized non-visible light; a camera configured to receive polarized non-visible light having an orientation which is rotated with respect to the emitted linearly polarized light; and control circuitry configured to: activate the plurality of non-visible light emitting elements to emit linearly polarized light towards a biometric object; and control the camera to capture an image based on light reflected by the biometric object having a polarization which is rotated with respect to the emitted linearly polarized light.

18 Claims, 6 Drawing Sheets

(51) Int. Cl.
*G06K 9/46* (2006.01)
*H04N 5/225* (2006.01)

(52) U.S. Cl.
CPC .......... *G06K 9/209* (2013.01); *G06K 9/2018* (2013.01); *G06K 9/2027* (2013.01); *G06K 9/4661* (2013.01); *H04N 5/2256* (2013.01); *H04N 5/2257* (2013.01)

(56) References Cited

U.S. PATENT DOCUMENTS

| | | |
|---|---|---|
| 2016/0140390 A1 | 5/2016 | Ghosh et al. |
| 2016/0320238 A1 | 11/2016 | Zhou et al. |
| 2017/0161578 A1 | 6/2017 | Ivanisov et al. |

* cited by examiner

US 11,068,733 B2

BIOMETRIC IMAGING SYSTEM AND METHOD OF DETERMINING PROPERTIES OF A BIOMETRIC OBJECT USING THE BIOMETRIC IMAGING SYSTEM

CROSS-REFERENCE TO RELATED APPLICATIONS

This application is a 371 U.S. National Stage of International Application No. PCT/SE2018/051167, filed Nov. 14, 2018, which claims priority to Swedish Patent Application No. 1751458-9, filed Nov. 28, 2017. The disclosures of each of the above applications are incorporated herein by reference in their entirety.

FIELD OF THE INVENTION

The present invention relates to a biometric imaging system comprising a display panel, and to a method of determining properties of a biometric object using the biometric imaging system. In particular, the present invention relates to a biometric imaging system comprising a display panel.

BACKGROUND OF THE INVENTION

Various types of biometric systems are used more and more in order to provide increased security and/or enhanced user convenience. In particular, Iris and Face recognition are becoming more common to be used as biometric verification and authentication techniques.

Along with the new types of biometric systems, there is still a requirement to ensure that the imaging target belongs to a real live human. Accordingly, liveness and anti-spoofing methods should be employed in a similar manner as for existing biometric systems such as fingerprint imaging systems.

One known method of determining if an observed eye belongs to a live human is to observe the pupil dilation and constriction when the eye is illuminated by visible light. However, in existing biometric systems for facial or iris recognition, one or more separate light sources such as infrared light-emitting diodes, IR-LEDs and/or ultraviolet light-emitting diodes, UV-LEDs, are commonly used to illuminate a biometric object such as the face or iris of a person, and a separate camera, e.g. an IR-camera is used to take a picture of the object illuminated by the IR-LED light source. Accordingly, since pupil dilation or constriction under illumination requires visible light, an additional light source would be required. Moreover, visible light aimed directly at the eye may be irritating to the eye.

It is also possible to determine that the eye belongs to a live person by observing specific and characteristic eye movements. However, such an observation takes a long time in comparison with what is expected of a biometric authentication and verification system in a consumer device such as a smartphone.

Accordingly, in view of the drawbacks of the above described methods, it is desirable to provide improved methods and systems for liveness detection in biometric imaging systems.

SUMMARY

In view of above-mentioned and other drawbacks of the prior art, it is an object of the present invention to provide a biometric imaging system facilitating liveness detection in biometric imaging.

According to a first aspect of the invention, there is provided a biometric imaging system comprising a display panel. The display panel in turn comprises: a plurality of display pixels configured to emit visible light and controllable to form an image in the display; and a plurality of non-visible light emitting elements configured to emit linearly polarized non-visible light; a camera configured to receive polarized non-visible light having an orientation which is rotated with respect to the emitted linearly polarized light; and control circuitry configured to: activate the plurality of non-visible light emitting elements to emit linearly polarized light towards a biometric object; and control the camera to capture an image based on light reflected by the biometric object having a polarization which is rotated with respect to the emitted linearly polarized light.

A display panel is in the present context interpreted to mean a display comprising all the layers and components required in known display technologies. The display panel comprises a pixel array where each pixel may comprise one or more light emitting elements. A pixel may for example comprise a red, green and blue light emitting region, where each light emitting region may comprise an individual light emitting element according to known display technologies. The individual light emitting elements or regions of a pixel may also be referred to as sub-pixels.

In optical biometric imaging systems such as in face and iris recognition systems where a biometric object in the form of the face or an eye of the user is illuminated, it is desirable to use non-visible light to illuminate the biometric object to avoid that the user is disturbed by visible light. Accordingly, the non-visible light emitting element is a light element configured to emit non-visible light, such as infrared (IR) or ultraviolet (UV) light.

In the present context, the biometric object is considered to be the eye of a human. Accordingly, the described system may be utilized in iris recognition systems where liveness detection is required.

It is known that certain distinguishing features of a human eye can be identified by emitting polarized light towards the eye and by observing the change in polarization in the reflected light. In particular, it is known that specific features can be observed by emitting linearly polarized light and to observe the reflected cross-polarized light, i.e. reflected light having a 90° rotation in relation to the emitted light. The features occur as a result of the birefringence properties of the human eye, rotating the polarization of light upon reflection in the eye, and a resulting refraction pattern can be observed in the reflected light. It should be noted that characterizing features may also be observed for other polarization rotations. However, in the following, a crossed polarization, i.e. a rotation of 90° between emitted and received light will be used as an exemplifying embodiment.

In view of the above, the present invention is based on the realization that the required non-visible light emitting elements emitting polarized light, facilitating the described method of liveness detection, advantageously are integrated in a display panel, thereby simplifying liveness detection in the biometric imaging system.

By activating the plurality of non-visible light emitting elements to emit linearly polarized light towards a human eye and by controlling the camera to capture an image based on light reflected by the biometric object having a polarization which is rotated 90° with respect to the emitted linearly polarized light, the resulting image of the eye can be further analyzed to determine if the eye belongs to a live person.

According to one embodiment of the invention, each of the plurality of non-visible light emitting elements may comprise a first linearly polarizing filter. Thereby, the light emitted from the non-visible light emitting element becomes polarized as it passes the filter. All of the light emitting elements preferably have filters providing the same polarization, so that all of the emitted non-visible light has the same polarization.

According to one embodiment of the invention, the camera may advantageously comprise a second linearly polarizing filter having a 90° rotation with respect to the first linearly polarizing filter of the light emitting elements. Thereby, the camera only captures non-visible light having a perpendicular polarization to the polarized light emitted by the non-visible light emitting elements having passed through the first polarizing filter.

According to one embodiment of the invention, the first and/or the second polarizing filter may be a polarizing coating layer. Thereby, the polarizing filters may be applied directly onto the non-visible light emitting elements and/or the camera without the need for a separate component performing the filtering.

According to one embodiment of the invention, the biometric imaging system may further comprise a polarizing layer located between the plurality of display pixels and a cover glass of the display panel. Some types of display panels such as OLED displays often comprise a polarizing layer to enhance the display contrast and to block internal reflections in the display. Thereby, such an existing polarizing layer can be used to polarize the light emitted by the non-visible light emitting elements. When utilizing such a polarizing layer as the first linearly polarizing filter, the second linearly polarizing filter comprised in the camera is configured to have a perpendicular polarization with respect to the first linearly polarizing filter.

According to one embodiment of the invention, where the first polarizing filter is provided in the form of a polarizing layer, the polarizing layer may comprise openings at locations of a subset of display pixels configured to emit non-visible light. Thereby, unpolarized non-visible light is emitted through the openings in the polarizing layer. The unpolarized non-visible light can be used for conventional iris recognition imaging. The birefringence-induced features occurring in the light reflected from the eye at 90° polarization may obscure the features of the iris required for iris recognition. Accordingly, by emitting unpolarized light, the same camera with the described polarizing filter can be used also for iris recognition since the birefringence-induced features will not be seen for emitted unpolarized light. However, it may be possible to perform conventional iris recognition using the described system also while emitting only polarized non-visible light. It is may also be possible to perform iris recognition by emitting both polarized and unpolarized non-visible light from the display panel, e.g. by activating all of the non-visible light emitting elements in the display panel.

According to one embodiment of the invention, at least a subset of the plurality of display pixels may each comprise a non-visible light emitting element. In other words, such a display pixel comprises both light emitting elements configured to emit visible light and one or more light emitting elements configured to emit non-visible light. Thereby, non-visible light emitting elements can be seamlessly integrated in display pixels and the biometric object can be illuminated directly with non-visible polarized light by the display panel without the need for additional light sources outside of the display panel. Depending on e.g. the light emitting properties of the non-visible light emitting elements, the density of non-visible light emitting elements in relation to the total number of display pixels can be varied according to the requirements of different applications. The non-visible light emitting elements may also have a non-uniform distribution in the display panel. There may for example be more non-visible light emitting elements in a portion of a display more likely to be close to the biometric object. Taking a smartphone as an example application, the density of non-visible light emitting elements in the display panel may be higher in an upper portion of the display panel compared to in a lower portion.

Accordingly, in one embodiment of the invention, at least a subset of the plurality of display pixels may comprise a red, green and blue light emitting element, and a non-visible light emitting element. It is also possible to form a display panel where all of the display pixels comprise a non-visible light emitting element, which for example may simplify manufacturing and design since all of the display pixels would have the same properties.

According to one embodiment of the invention, a first subset of the plurality of display pixels may consist of a non-visible light emitting element, and a second subset of the plurality of display pixels may consist of a red, green and blue light emitting element. Thereby, it is possible to form a display panel where pixels consisting only of a non-visible light emitting element can be seen as taking the place of a normal RGB display pixel. The density and distribution of such non-visible light emitting pixels can be selected based on requirements of a particular display panel.

According to one embodiment of the invention, the control circuitry may be further configured to determine if the biometric object belongs to a real person based on birefringent properties of the biometric object observed in the captured image. Accordingly, liveness detection or anti-spoofing can be achieved. Liveness detection can be performed by analyzing the acquired image based on cross polarized light to determine if an expected refraction patterns occur. It may also be possible to compare the image based on cross polarized light with an image captured using unpolarized light to determine if differences between the two images correspond to an expected refraction pattern.

According to one embodiment of the invention, the non-visible light emitting elements may be either infrared light emitting elements or ultraviolet light emitting elements. The light emitting elements may for example be light emitting diodes.

There is also provided an electronic device comprising a biometric imaging system according to any one of the preceding claims. The electronic device may be smartphone, a tablet computer or a laptop. However, the described biometric imaging system may equally well be included in stationary systems for biometric verification as long as the system comprises a display panel.

According to a second aspect of the invention, there is provided a method of determining properties of a biometric object using a biometric imaging system. The system comprising: a display panel comprising: a plurality of display pixels configured to emit visible light and controllable to form an image in the display; and a plurality of non-visible light emitting elements configured to emit linearly polarized non-visible light; and a camera configured to receive polarized non-visible light having a rotation with respect to the emitted linearly polarized light. The method comprises: activating the plurality of non-visible light emitting elements to emit linearly polarized light towards a biometric object; and controlling the camera to capture an image based on light reflected by the biometric object having a polarization which is rotated with respect to the emitted linearly polarized light.

As discussed above, the camera may advantageously be configured to capture light having a 90° polarization rotation with respect to the emitted light. However, other polarization rotations are also possible.

According to one embodiment of the invention, the method may further comprise: determining birefringent properties of the biometric object based on the captured image; and determining if the biometric object belongs to a real person based on the birefringent properties of the biometric object.

According to one embodiment of the invention, the method may further comprise identifying a refraction pattern of the biometric object in the captured image; comparing the refraction pattern with a group of predetermined refraction patterns; and if the identified refraction pattern correspond to a refraction pattern of the group of predetermined refraction patterns, determine that the biometric object belongs to a real person.

The possible refraction patterns for different polarization rotations can be assumed to be known. The refraction pattern for 90° polarized light may for example be an isogyre, also referred to as a corneal isogyre.

According to one embodiment of the invention, the method may further comprising capturing a second image of the biometric object based on all light reflected from the biometric object; and comparing the second image with the captured image based on light reflected by the biometric object having a polarization which is rotated 90° with respect to the emitted linearly polarized light.

According to one embodiment of the invention the method may further comprise determining that the biometric object belongs to a real person if a pattern is observed in the image based on polarized light which is not observed in the second image.

Additional effects and features of the second aspect of the invention are largely analogous to those described above in connection with the first aspect of the invention.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

These and other aspects of the present invention will now be described in more detail, with reference to the appended drawings showing an example embodiment of the invention, wherein.

DETAILED DESCRIPTION OF EXAMPLE EMBODIMENTS

In the present detailed description, various embodiments of the biometric imaging system and method for determining properties of a biometric object using the imaging system according to the present invention are mainly described with reference to an imaging system comprises in smartphone. It should however be noted that the described system and method is applicable in a range of different applications.

Figure 1:
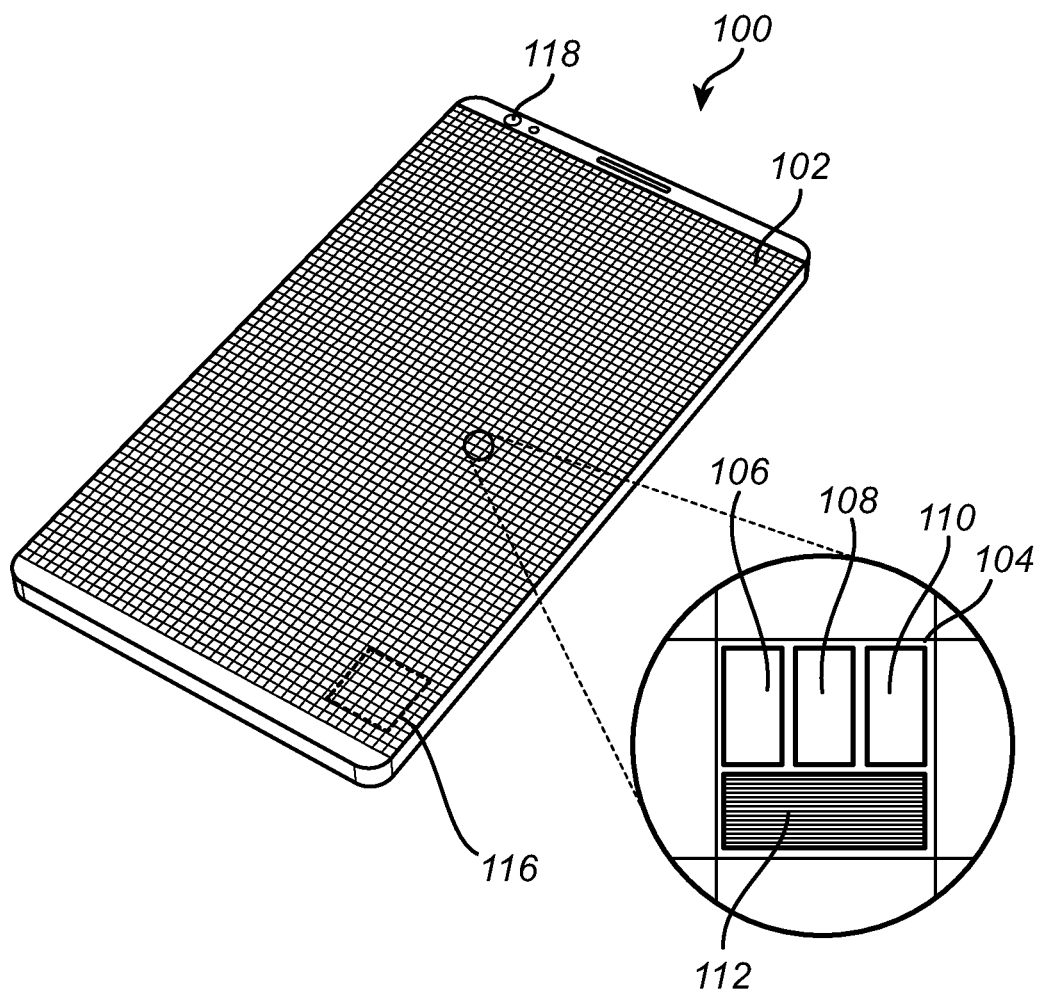
FIG. 1 schematically illustrates a biometric imaging system according to an embodiment of the invention.

FIG. 1 schematically illustrates a smartphone 100 comprising a biometric imaging system according to an embodiment of the invention. The biometric imaging system comprises a display panel 102 forming part of the smartphone 100. The display panel 102 in turn comprises a plurality of display pixels 104 arranged in a pixel array. The display pixels 104 are conventional display pixels according to any known display technology where the display pixels 104 are controllable to form a visible image in the display. The display panel 102 further comprises a plurality of individually controllable non-visible light emitting elements 112 configured to emit linearly polarized non-visible light. The non-visible light emitting elements 112 may be infrared (IR) or ultraviolet (UV) light emitting diodes.

Figure 2:
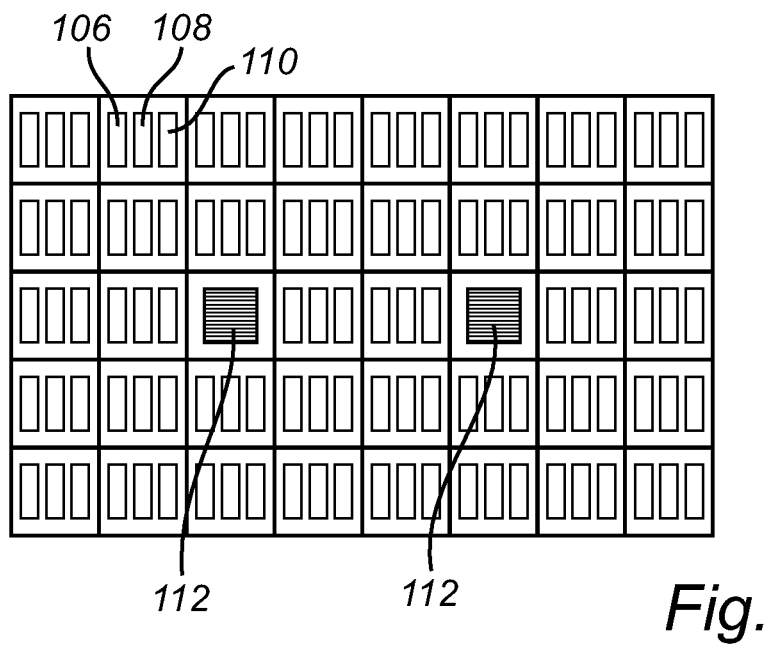
FIG. 2 schematically illustrates features of a biometric imaging system according to an embodiment of the invention.

As exemplified in the zoomed-in portion of FIG. 1, each illustrated display pixel 104 comprises a red, green and blue (RGB) light emitting element 106, 108, 110 and a non-visible light emitting element 112. An alternative configuration of the display panel 102 is illustrated in FIG. 2, where the non-visible light emitting elements 112 are arranged as individual pixels in the pixel array, each non-visible light emitting elements 112 taking the place of an RGB pixel.

The non-visible light emitting elements 112 are configured to emit linearly polarized non-visible light, and the biometric imaging system further comprises a camera 118 configured to receive polarized non-visible light having a rotation with respect to the emitted linearly polarized light. The camera 118 is here illustrated as a front-facing camera 118 arranged in the smartphone outside of the active display area. However, it should be noted that the camera 118 may be provided in other configurations, such as in the form of a camera integrated in a display, to the same effect as described herein. The camera 118 may also be configured to sense both visible and non-visible (IR and/or UV) light.

Moreover, the biometric imaging system comprises a control unit 116 configured to control the biometric imaging system. The control unit 116 may include a microprocessor, microcontroller, programmable digital signal processor or another programmable device. The control unit 116 may also, or instead, include an application specific integrated circuit, a programmable gate array or programmable array logic, a programmable logic device, or a digital signal processor. Where the control unit 116 includes a programmable device such as the microprocessor, microcontroller or programmable digital signal processor mentioned above, the processor may further include computer executable code that controls operation of the programmable device.

The functionality of the control unit 116 may also be integrated in a control unit used for controlling the display panel 102 or other features of the smartphone 100.

Figure 3:
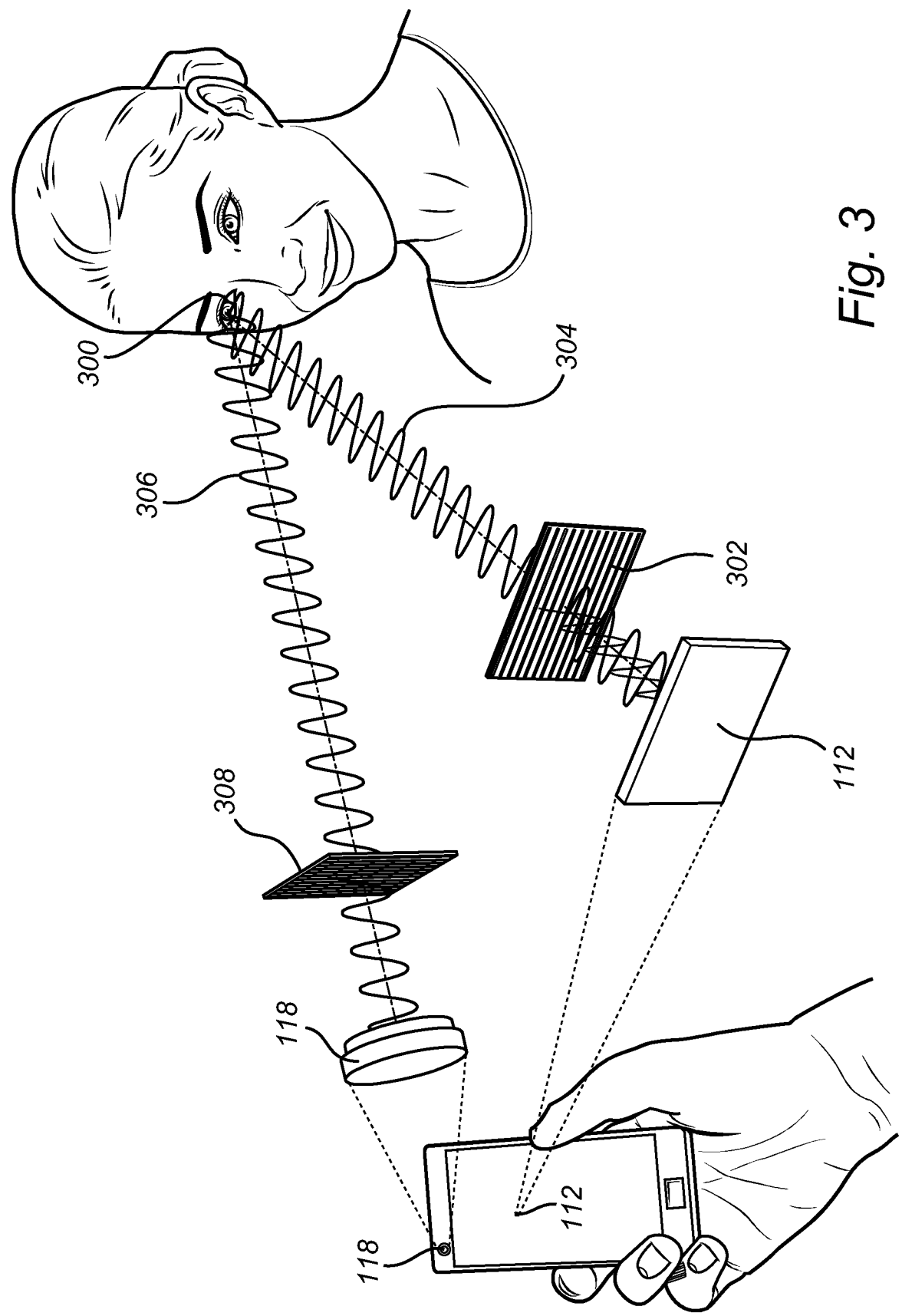
FIG. 3 schematically illustrates features of a biometric imaging system according to an embodiment of the invention.
Figure 4:
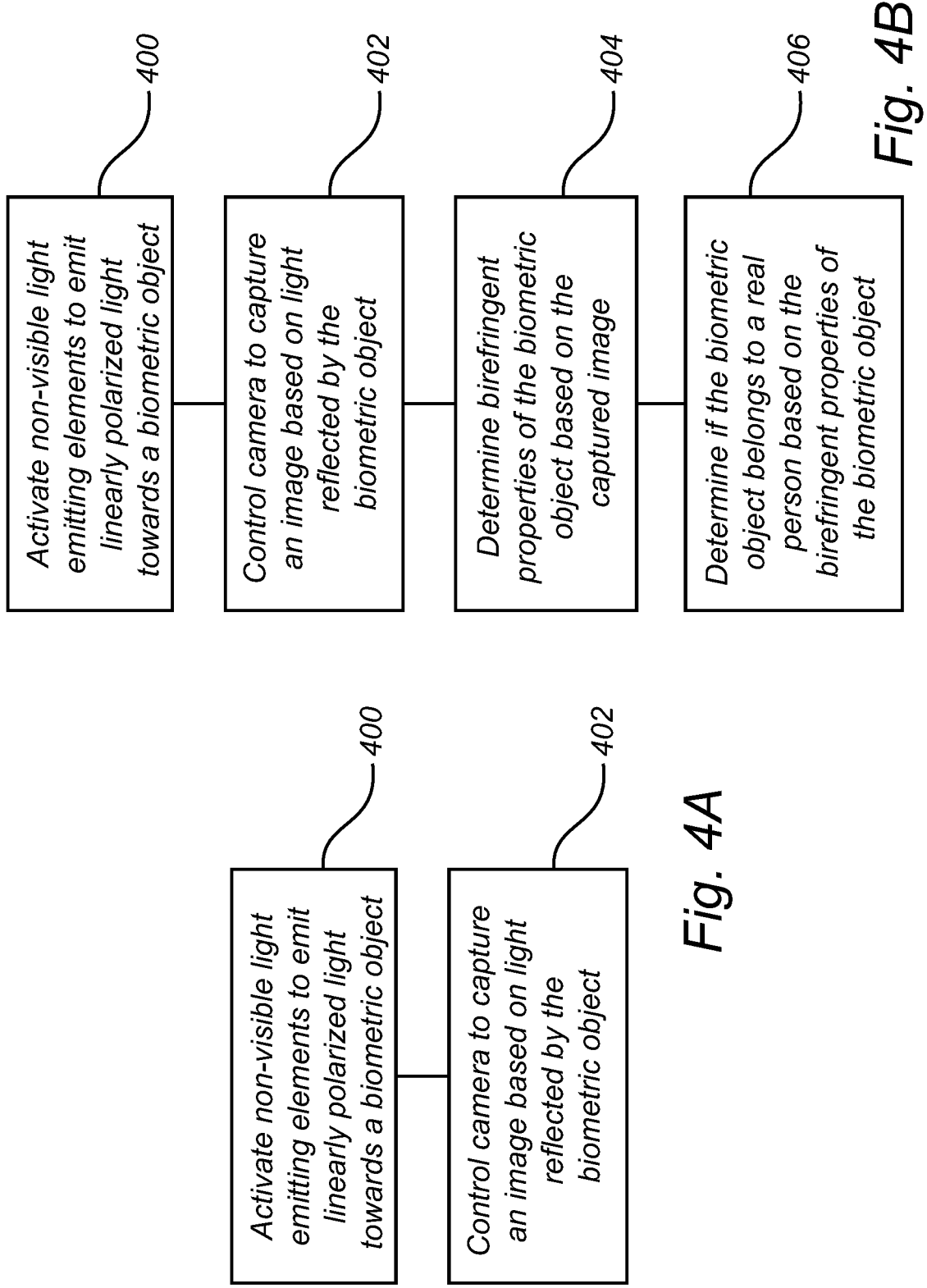
FIGS. 4A-B are flow charts outlining general steps of methods according to embodiments of the invention.

The operating principle of the biometric imaging system will be described with reference to FIG. 3 schematically illustrating biometric imaging using the described system and to FIGS. 4A-B schematically outlining steps of methods according to embodiments of the invention.

The control unit 116 is configured to activate 400 the plurality of non-visible light emitting elements 112 to emit linearly polarized light towards a biometric object 300 in the form of a human eye 300 and to control 402 the camera 118 to capture 402 an image based on light reflected by the biometric object 300 having a polarization which is rotated with respect to the emitted linearly polarized light.

The light emitted by the non-visible light-emitting element 112 is passed through a first linearly polarizing filter 302. Thereby, linearly polarized light 304 having a known polarization is emitted towards the eye 300. The light 304 is reflected in the eye 300 and due to the birefringent properties of the eye 300, and in particular of the cornea, at least a portion of the reflected light 306 will have a different polarization after reflection. In FIG. 3, the reflected light 306 is illustrated as being rotated 90°, i.e. cross-polarized, to simplify the explanation and to avoid cluttering the drawings. However, in practice the reflected light 306 may comprise light having all polarizations. As further illustrated by FIG. 3, the camera 118 is provided with a second linearly polarizing filter 308 being rotated 90° with respect to the first polarizing filter 302. It is not strictly required that the second polarizing filter 308 is rotated 90° with respect to the first polarizing filter 302. For example any rotation between 45° and 135° may provide results allowing a liveness detection to be performed.

Accordingly, the camera 118 is configured to receive polarized non-visible light 306 having a 90° rotation with respect to the emitted linearly polarized light 304. Based on the filtered polarized light received by the camera 118, an image is captured and birefringent properties of the biometric object 300 are determined 404 based on the captured image. Furthermore, based on the birefringent properties, it can be determined 406 if the biometric object 300 belongs to a real person.

Figure 5:
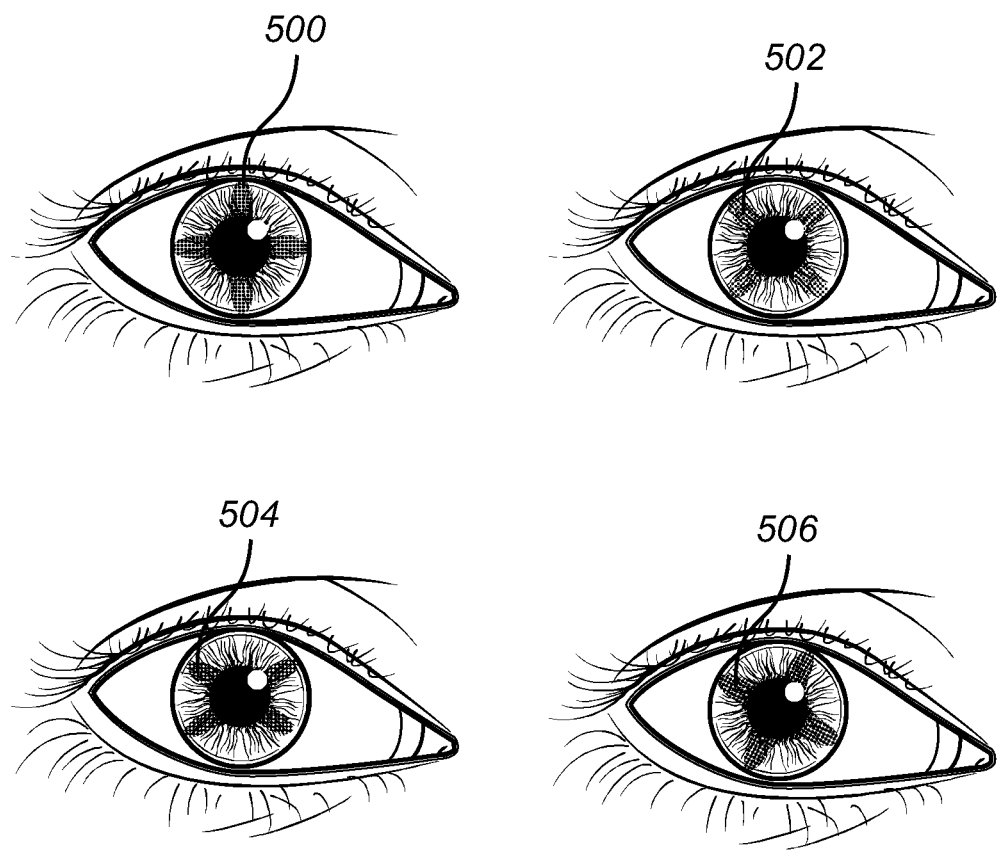
FIG. 5 schematically illustrates features of a biometric imaging system according to an embodiment of the invention.

FIG. 5 schematically illustrates example refraction patterns of a human eye in the form of corneal isogyres, 500, 502, 504, 506 of differing orientations. The method for liveness detection may further comprise identifying a refraction pattern of the biometric object 300 in the captured image and comparing the refraction pattern with a group of predetermined refraction patterns such as isogyres 500, 502, 504, 506. If the identified refraction pattern corresponds to a refraction pattern of the group of predetermined refraction patterns, it can be determined that the eye 300 belongs to a real person.

It is also possible to perform liveness detection by comparing a captured image based on the crossed polarizers 302, 308 with a normal image captured with a regular camera without polarizing filters, and to determine if any pattern is visible in the image based on polarized filtered light which is not apparent in the normal image captured based on non-polarized light.

Figure 6A:
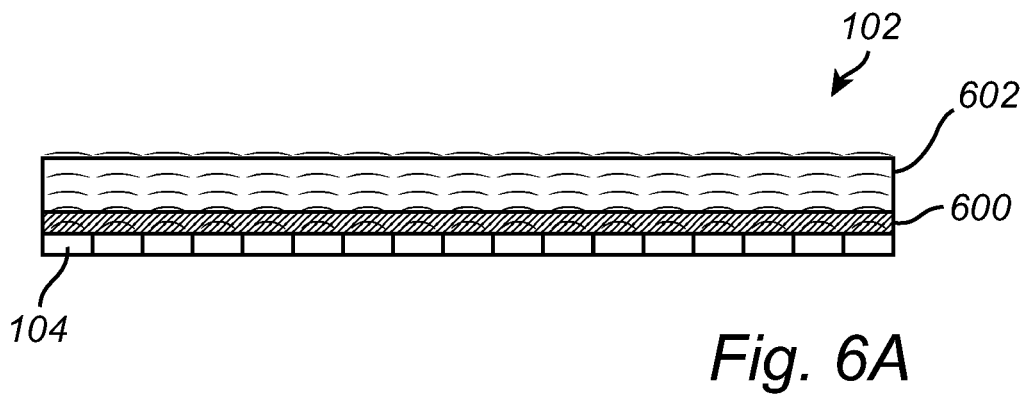
FIGS. 6A-C schematically illustrates features of a biometric imaging system according to an embodiment of the invention.
Figure 6B:
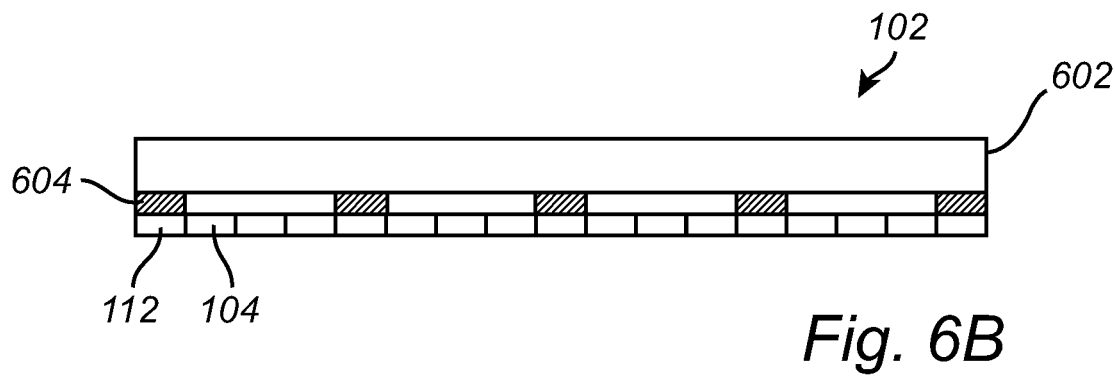
Figure 6C:
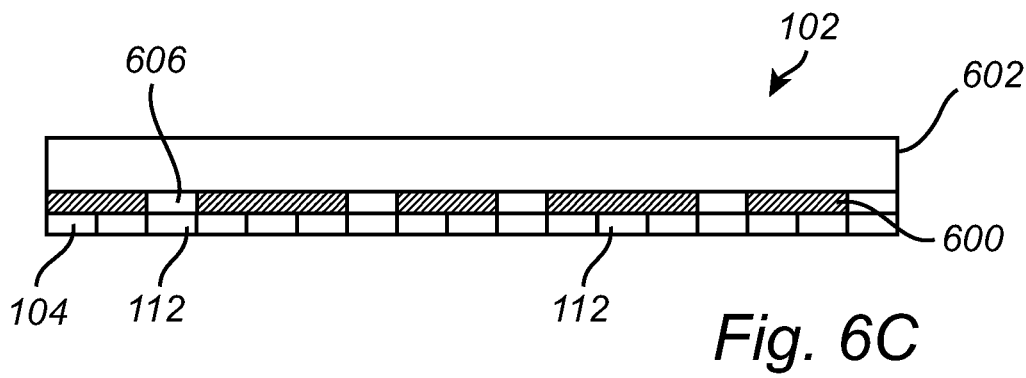

FIGS. 6A-C schematically illustrate various embodiments of the biometric imaging system, in particular describing example configurations of polarizing filters. In FIG. 6A, the polarizing filter is provided in the form of a polarizing layer 600 arranged between the pixels 104 and a cover glass 602 of the display panel 102. It is to be understood that depending on the display technology used, there may be one or more additional layers located on either side of the polarizing layer 600 without changing the operating principle of the described system FIG. 6B is a side view of the pixel configuration illustrated in FIG. 2B where a first subset of the plurality of display pixels consists of a non-visible light emitting element 112, and wherein a second subset of the plurality of display pixels 104 consists of a red, green and blue light emitting element 106, 108, 110. In FIG. 6B a polarizing filter in the form of a coating 604 is provided only at the locations of the pixels consisting of a non-visible light emitting element 112. It is also possible to provide a polarizing coating on only a selected subset of the non-visible light emitting elements 112 such that the display panel 102 is capable of emitting both polarized an unpolarized non-visible light.

In FIG. 6C, the polarizing layer 602 comprises openings at locations of a subset of display pixels configured to emit non-visible light, i.e. either pixels comprising RGB light emitting elements 106, 108, 110 and a non-visible light emitting element 112 as illustrated in FIG. 1 or pixels consisting of only a non-visible light emitting element 112 as illustrated in FIG. 2. Thereby, the described in-display non-visible light emitting elements 112 may be used as light sources in an iris or facial recognition system to illuminate the biometric object. Accordingly, iris recognition can also be achieved with the described system using the described camera 118. It is also possible to provide an additional camera (not shown) for capturing non-visible light but without a polarizing filter.

Figures 7A, 7B:
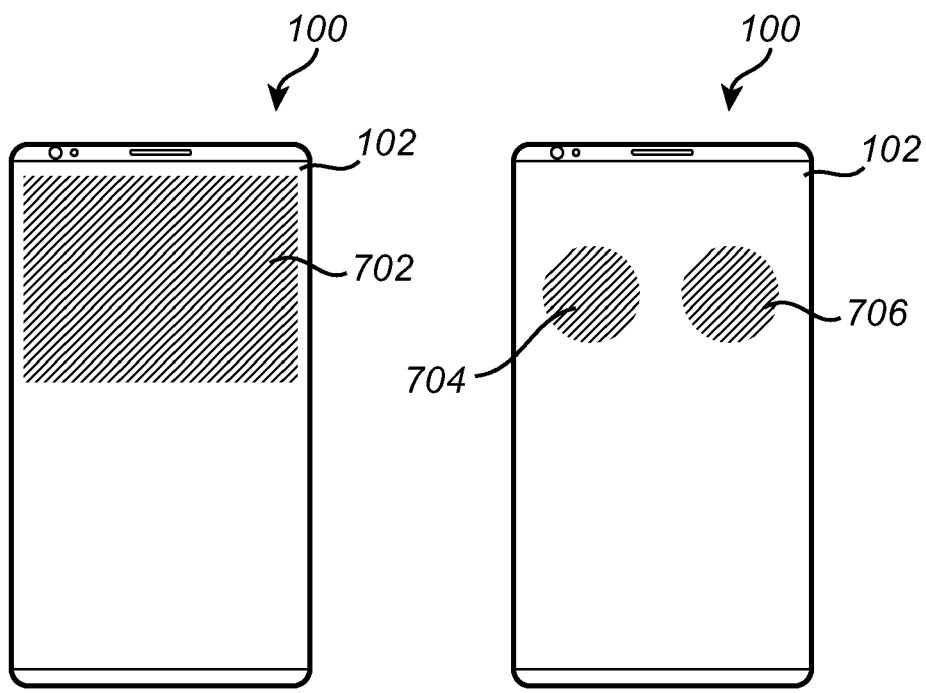
FIG. 7A-B schematically illustrates features of a biometric imaging system according to an embodiment of the invention.

FIGS. 7A and 7B schematically illustrate embodiments where only selected portions 702, 704, 706 of the display panel 102 comprises non-visible light emitting elements 112. Here, the non-visible light emitting elements 112 are located in areas of the display panel 102 assumed to be closest to the biometric object 300 during normal use of the smartphone 100. In FIG. 7A, a rectangular upper portion 702 of the display panel comprises non-visible light emitting elements 112 and in FIG. 7B two substantially circular portions 704, 706 are considered to comprise non-visible light emitting elements 112. The two substantially circular portions 704, 706 can be assumed to approximately correspond to the location of the eyes of the user in a normal use case.

Even though the invention has been described with reference to specific exemplifying embodiments thereof, many different alterations, modifications and the like will become apparent for those skilled in the art. Also, it should be noted that parts of the system and method may be omitted, interchanged or arranged in various ways, the system and method yet being able to perform the functionality of the present invention.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:
1. A biometric imaging system comprising:
 a display panel comprising a plurality of display pixels configured to emit visible light and controllable to form an image in the display, and a plurality of non-visible light emitting elements configured to emit linearly polarized non-visible light;

a camera configured to receive polarized non-visible light having an orientation which is rotated with respect to the emitted linearly polarized light; and control circuitry configured to:
- activate the plurality of non-visible light emitting elements to emit linearly polarized light towards a biometric object, the biometric object being an eye; and
- control the camera to capture an image based on light reflected by the biometric object having a polarization which is rotated with respect to the emitted linearly polarized light; and
- determine if the biometric object belongs to a real person based on birefringent properties of the biometric object observed in the captured image.

2. The biometric imaging system according to claim 1, wherein the camera is configured to receive polarized non-visible light having a 90° rotation with respect to the emitted linearly polarized light.

3. The biometric imaging system according to claim 1, wherein each of the plurality of non-visible light emitting elements comprises a first linearly polarizing filter.

4. The biometric imaging system according to claim 3, wherein the camera comprises a second linearly polarizing filter having a 90° rotation with respect to the first linearly polarizing filter.

5. The biometric imaging system according to claim 3, wherein the first and/or the second polarizing filter is a polarizing coating layer.

6. The biometric imaging system according to claim 1, further comprising a polarizing layer located between the plurality of display pixels and a cover glass of the display panel.

7. The biometric imaging system according to claim 6, wherein the polarizing layer comprises openings at locations of a subset of display pixels configured to emit non-visible light.

8. The biometric imaging system according to claim 1, wherein at least a subset of the plurality of display pixels each comprises a non-visible light emitting element.

9. The biometric imaging system according to claim 1, wherein at least a subset of the plurality of display pixels comprises a red, green and blue light emitting element, and a non-visible light emitting element.

10. The biometric imaging system according to claim 1, wherein a first subset of the plurality of display pixels consists of a non-visible light emitting element, and wherein a second subset of the plurality of display pixels consists of a red, green and blue light emitting element.

11. The biometric imaging system according to claim 1, wherein the non-visible light emitting elements are infrared light emitting elements or ultraviolet light emitting elements.

12. An electronic device comprising a biometric imaging system according to claim 1.

13. A method of determining properties of a biometric object using a biometric imaging system, the system comprising: a display panel comprising: a plurality of display pixels configured to emit visible light and controllable to form an image in the display; and a plurality of non-visible light emitting elements configured to emit linearly polarized non-visible light; and a camera configured to receive polarized non-visible light having a rotation with respect to the emitted linearly polarized light, the method comprising:
- activating the plurality of non-visible light emitting elements to emit linearly polarized light towards a biometric object, the biometric object being an eye;
- controlling the camera to capture an image based on light reflected by the biometric object having a polarization which is rotated with respect to the emitted linearly polarized light;
- determining birefringent properties of the biometric object based on the captured image; and
- determining if the biometric object belongs to a real person based on the birefringent properties of the biometric object.

14. The method according to claim 13, further comprising identifying a refraction pattern of the biometric object in the captured image;
- comparing the refraction pattern with a group of predetermined refraction patterns; and
- if the identified refraction pattern corresponds to a refraction pattern of the group of predetermined refraction patterns, determine that the biometric object belongs to a real person.

15. The method according to claim 14, further comprising identifying a refraction pattern located in the cornea of the eye.

16. The method according to claim 15, wherein the refraction pattern is an isogyre.

17. The method according to claim 16, further comprising capturing a second image of the biometric object based on all light reflected from the biometric object; and
- comparing the second image with the captured image based on light reflected by the biometric object having a polarization which is rotated 90° with respect to the emitted linearly polarized light.

18. The method according to claim 17, further comprising determining that the biometric object belongs to a real person if a pattern is observed in the image based on polarized light which is not observed in the second image.

* * * * *